United States Patent
Hiwatashi et al.

(10) Patent No.: US 10,082,124 B2
(45) Date of Patent: Sep. 25, 2018

(54) VEHICLE CONTROL DEVICE

(71) Applicant: Mazda Motor Corporation, Aki-gun, Hiroshima (JP)

(72) Inventors: Keiichi Hiwatashi, Aki-gun (JP); Yasunori Takahara, Hiroshima (JP); Daisaku Ogawa, Hiroshima (JP); Daisuke Umetsu, Hiroshima (JP); Chikako Ohisa, Aki-gun (JP); Koichi Kimoto, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/696,456

(22) Filed: Sep. 6, 2017

(65) Prior Publication Data
US 2018/0066625 A1 Mar. 8, 2018

(30) Foreign Application Priority Data
Sep. 8, 2016 (JP) ................................. 2016-175432

(51) Int. Cl.
*F02P 5/15* (2006.01)
*F01N 3/10* (2006.01)
(Continued)

(52) U.S. Cl.
CPC .............. *F02P 5/1504* (2013.01); *F01N 3/10* (2013.01); *F02D 41/0005* (2013.01);
(Continued)

(58) Field of Classification Search
CPC .. F02P 5/1504; F02P 5/045; F02P 5/06; F02P 5/142; F02D 2200/50; F02D 2200/501;
(Continued)

(56) References Cited

U.S. PATENT DOCUMENTS

| 5,559,703 A | 9/1996 | Iwata et al. |
| 2016/0281671 A1* | 9/2016 | Kim ........................ F02P 5/045 |

(Continued)

FOREIGN PATENT DOCUMENTS

| JP | H07054685 A | 2/1995 |
| JP | H07166907 A | 6/1995 |

(Continued)

*Primary Examiner* — Lindsay Low
*Assistant Examiner* — George Jin
(74) *Attorney, Agent, or Firm* — Alleman Hall Creasman & Tuttle LLP

(57) ABSTRACT

A vehicle control device is provided, which includes an engine including an ignition plug oriented inside a combustion chamber, a component provided in or near an exhaust passage of the engine, a processor configured to execute a vehicle attitude controlling module for controlling an attitude of a vehicle by retarding an ignition timing of the ignition plug to reduce an engine torque so as to decelerate the vehicle, when a condition is satisfied, the condition being that the vehicle is traveling and a steering angle related value that is related to a steering angle of a steering device increases, and a torque reduction restricting module for restricting a reduction amount of the engine torque as at least one of an engine load and an engine speed increases during the vehicle attitude control.

16 Claims, 10 Drawing Sheets

(51) Int. Cl.
*F02D 41/00* (2006.01)
*F02P 5/04* (2006.01)

(52) U.S. Cl.
CPC .......... *F02D 41/0007* (2013.01); *F02P 5/045* (2013.01); *F02D 2200/50* (2013.01)

(58) Field of Classification Search
CPC .... F02D 41/0007; F02D 41/0005; F01N 3/10; F01N 3/101
See application file for complete search history.

(56) References Cited

U.S. PATENT DOCUMENTS

2017/0145940 A1* 5/2017 Ohisa .................... B60W 30/16
2017/0175659 A1* 6/2017 Sunahara ............ F02D 41/0087

FOREIGN PATENT DOCUMENTS

| | | |
|---|---|---|
| JP | 2003159964 A | 6/2003 |
| JP | 2014166014 A | 9/2014 |
| JP | 2015231840 A | 12/2015 |

* cited by examiner

VEHICLE CONTROL DEVICE

BACKGROUND

The present disclosure relates to a vehicle control device, and more particularly to a vehicle control device that achieves a desired vehicle attitude (vehicle behavior) by performing an engine control.

Conventionally, devices which control the behavior of a vehicle to a safe direction when the behavior of the vehicle becomes unstable due to a slip, etc. (such as an antiskid brake system (ABS)) are known. For example, devices which detect that a behavior such as understeering or oversteering occurs with the vehicle during cornering, etc. of the vehicle, and apply a suitable deceleration to the wheels so that the behavior is controlled are known.

Meanwhile, a vehicle movement controller is known, that adjusts a deceleration during cornering to control loads applied to front wheels which are steerable wheels so that a series of operations by a vehicle driver (breaking, steering-in, accelerating, steering-back, etc.) during cornering of a vehicle in a normal traveling state become natural and stable, unlike the above control executed for a safety improvement in the traveling state where the behavior of the vehicle becomes unstable.

Further, JP2014-166014A discloses a behavior control device for a vehicle which reduces a driving force (torque) of the vehicle according to a yaw-rate related amount corresponding to a steering operation by a vehicle driver (e.g., yaw acceleration) to quickly decelerate the vehicle when the driver starts the steering operation so that a sufficient load is quickly applied to front wheels which are steerable wheels. According to this behavior control device, a frictional force between the front wheels and a road surface increases and a cornering force of the front wheels increases by quickly applying the loads to the front wheels when the steering operation is started. Therefore, turnability of the vehicle in an early stage of curve entry improves, and a response to the steering-in operation (steering stability) improves. Thus, a vehicle behavior intended by the driver is achieved.

In the behavior control device described in JP2014-166014A, a vehicle attitude is controlled by decelerating the vehicle according to the steering operation by the driver. This vehicle attitude control may be executed by, for example, retarding an ignition timing of an ignition plug of an engine more than in a normal operation (that is, when the vehicle attitude control is not executed), so that an engine torque is reduced. This method is effective especially in a turbocharged engine.

In the turbocharged engine, when reducing the engine torque, the turbocharger is generally controlled to lower a turbocharging pressure. However, if the turbocharging pressure is lowered to temporarily reduce the engine torque in the vehicle attitude control, when increasing the engine torque after the vehicle attitude control, the speed of the turbocharging pressure increase cannot catch up with the torque increase and the acceleration response delays. For this reason, in the turbocharged engine, it is desirable to retard the ignition timing of the ignition plug than in the normal operation so as to reduce the engine torque in a state where the turbocharging pressure is kept substantially constant during the vehicle attitude control.

Meanwhile, when the ignition timing of the ignition plug is retarded, an exhaust gas temperature tends to rise. Therefore, in the above configuration of retarding the ignition timing during the vehicle attitude control, when the vehicle attitude control is frequently executed (e.g., when the vehicle attitude control tends to be frequently executed while the vehicle is traveling on a road, such as, a winding road), the frequency of retarding the ignition timing increases and the exhaust gas temperature becomes high. Particularly, within an operating range where an engine load and/or an engine speed are/is high (e.g., within a turbocharging range of the turbocharged engine), the exhaust gas temperature easily becomes high. When the exhaust gas temperature becomes high, there is a possibility that reliability of engine components (especially, exhaust system components) lowers.

SUMMARY

The present disclosure is made in view of solving the issues of the conventional arts described above, and aims to provide a vehicle control device, that controls attitude of a vehicle by retarding an ignition timing to reduce an engine torque, and suitably prevents decreasing the reliability of a component provided in or near an exhaust passage.

According to one aspect of the present disclosure, a vehicle control device is provided, that includes an engine including an ignition plug oriented inside a combustion chamber, a component provided in or near an exhaust passage of the engine, and a processor configured to execute a vehicle attitude controlling module for controlling attitude of a vehicle by retarding an ignition timing of the ignition plug to reduce an engine torque so as to decelerate the vehicle, when a condition is satisfied, the condition being that the vehicle is traveling and a steering angle related value that is related to a steering angle of a steering device increases, and a torque reduction restricting module for restricting a reduction amount of the engine torque as at least one of an engine load and an engine speed increases during the vehicle attitude control.

According to this configuration, the vehicle attitude controlling module controls the vehicle attitude by retarding the ignition timing of the ignition plug to reduce the engine torque so as to decelerate the vehicle, when the condition is satisfied. Further, when executing the vehicle attitude control, the torque reduction restricting module restricts the reduction amount of the engine torque (the torque reduction amount) as at least one of the engine load and the engine speed increases. Thus, when the vehicle attitude control is executed within a high engine speed range and/or a high engine load range, by suitably restricting the torque reduction amount, the retarding amount of the ignition timing is restricted and an exhaust gas temperature is prevented from becoming high. As a result, it becomes possible to prevent decreasing the reliability of the component provided in or near the exhaust passage.

Note that "the component" includes sensors disposed in the exhaust passage, an exhaust purification catalyst, and various kinds of actuators provided close to the exhaust passage, for example.

The torque reduction restricting module may restrict the reduction amount of the engine torque as the engine load and the engine speed increase.

According to this configuration, the torque reduction amount is restricted based on both the engine load and the engine speed. Therefore, the exhaust gas temperature is surely prevented from becoming high and decreasing the reliability of the component is effectively prevented.

The engine may include a turbocharger having a compressor that is provided in an intake passage of the engine and for turbocharging by the compressor intake air to be supplied into the combustion chamber within a turbocharging range where the engine load is above a given value. The torque reduction restricting module may restrict the engine torque reduction amount regardless of being within the turbocharging range.

According to this configuration, in the turbocharged engine, the torque reduction amount is suitably restricted within a wide operating range.

The engine may include a turbocharger having a compressor that is provided in an intake passage of the engine and for turbocharging by the compressor intake air to be supplied into the combustion chamber within a turbocharging range where the engine load is above a given value. The first operating range may be set within the turbocharging range.

According to this configuration, the torque reduction amount is restricted when the engine operating range is within the first operating range in the turbocharging range where the exhaust gas temperature easily becomes high. Therefore, rising of the exhaust gas temperature is suitably controlled and decreasing the reliability of the component is effectively prevented.

The vehicle attitude controlling module may reduce the engine torque by reducing an amount of intake air supplied into a cylinder of the engine in addition to retarding the ignition timing, the ignition timing being retarded at a higher rate with respect to a reduction amount of the intake air amount within the turbocharging range than outside the turbocharging range.

According to this configuration, in the case of executing the vehicle attitude control within the turbocharging range, since the intake air amount is reduced less whereas the ignition timing is retarded more, accordingly, the engine torque is suitably reduced while the turbocharging pressure is prevented from lowering. Thus, a response to an acceleration after the vehicle attitude control is secured.

The vehicle control device may further include a temperature detector provided in the exhaust passage. The given load may be set lower as the temperature detected by the temperature detector is higher.

According to this configuration, when the temperature of an exhaust system is high, the range which is defined by the engine load and where the torque reduction amount is restricted is extended. Thus, decreasing the reliability of the component is effectively prevented.

The torque reduction restricting module may restrict the reduction amount of the engine torque when an operating range of the engine is within the first operating range and a second operating range where an engine speed is above a given speed.

According to this configuration, the torque reduction amount is restricted based on both the engine load and the engine speed. Therefore, the exhaust gas temperature is surely prevented from becoming high and decreasing the reliability of the component is effectively prevented.

The torque reduction restricting module may restrict, during the vehicle attitude control, a reduction amount of the engine torque more when an engine load is a first load and an engine speed is a first speed than at least one of when the engine load is a second load and when the engine speed is a second speed, the second load being below the first load, the second speed being below the first speed.

According to this configuration, the torque reduction amount is restricted based on both the engine load and the engine speed. Therefore, an exhaust gas temperature is surely prevented from becoming high and decreasing the reliability of the component is effectively prevented.

According to another aspect of the present disclosure, a vehicle control device applied to a vehicle having an engine including an ignition plug oriented inside a combustion chamber, and a component provided in or near an exhaust passage of the engine, is provided. The device includes a processor configured to execute a vehicle attitude controlling module for controlling attitude of a vehicle by retarding an ignition timing of the ignition plug to reduce an engine torque so as to decelerate the vehicle, when a condition is satisfied, the condition being that the vehicle is traveling and a steering angle related value that is related to a steering angle of a steering device increases, and a torque reduction restricting module for restricting a reduction amount of the engine torque as at least one of an engine load and an engine speed increases during the vehicle attitude control.

According to this configuration, by suitably restricting the torque reduction amount, an exhaust gas temperature is prevented from becoming high and decreasing the reliability of the component is prevented.

The torque reduction restricting module may restrict, during the vehicle attitude control, a reduction amount of the engine torque more within a first operating range of the engine where an engine load is above a given load than outside the first operating range.

According to this configuration, by suitably restricting the torque reduction amount, the retarding amount of the ignition timing is restricted. Therefore, an exhaust gas temperature is prevented from becoming high and decreasing the reliability of the component is prevented.

According to another aspect of the present disclosure, a vehicle control device is provided, that includes an engine including an ignition plug oriented inside a combustion chamber, a component provided in or near an exhaust passage of the engine, a processor configured to execute a vehicle attitude controlling module for controlling attitude of a vehicle by retarding an ignition timing of the ignition plug to reduce an engine torque so as to decelerate the vehicle, when a condition is satisfied, the condition being that the vehicle is traveling and a steering angle related value that is related to a steering angle of a steering device increases, and a torque reduction restricting module for restricting, during the vehicle attitude control, a reduction amount of the engine torque more when an engine load is a first load than when the engine load is a second load that is below the first load.

According to this configuration, by suitably restricting the torque reduction amount, an exhaust gas temperature is prevented from becoming high and decreasing the reliability of the component is prevented.

According to another aspect of the present disclosure, a vehicle control device is provided, that includes an engine including an ignition plug oriented inside a combustion chamber, a component provided in or near an exhaust passage of the engine, a processor configured to execute a vehicle attitude controlling module for controlling attitude of a vehicle by retarding an ignition timing of the ignition plug to reduce an engine torque so as to decelerate the vehicle, when a condition is satisfied, the condition being that the vehicle is traveling and a steering angle related value that is related to a steering angle of a steering device increases, and a torque reduction restricting module for restricting, during the vehicle attitude control, a reduction amount of the engine torque more when an engine speed is a first speed than when the engine speed is a second speed that is below the first speed.

Also according to this configuration, by suitably restricting the torque reduction amount, an exhaust gas temperature is prevented from becoming high and decreasing the reliability of the component is prevented.

The torque reduction restricting module may set a torque reduction amount restriction value for restricting the reduction amount of the engine torque and, when the reduction amount of the engine torque is above the torque reduction amount restriction value, control the engine torque to gently follow the torque corresponding to the torque reduction amount restriction value.

According to this configuration, a sharp change of the engine torque when restricting the torque reduction amount is prevented.

The torque reduction restricting module may restrict the reduction amount of the engine torque by restricting the retarding of the ignition timing.

According to this configuration, since the retarding amount of the ignition timing is restricted so as to restrict the torque reduction amount, the exhaust gas temperature is effectively prevented from becoming high.

The vehicle control device may further include a steering angle sensor for detecting the steering angle of the steering device. The vehicle attitude controlling module may use a condition that a change speed of the detected steering angle is above a given value as the condition that the steering angle related value increases.

The component may include an exhaust purification catalyst provided in the exhaust passage and for purifying exhaust gas of the engine.

According to this configuration, the reliability of the exhaust purification catalyst which easily receives an influence from high-temperature exhaust gas is surely prevented from lowering.

DETAILED DESCRIPTION OF EMBODIMENTS

Hereinafter, a vehicle control device according to some embodiments of the present disclosure are described with reference to the accompanying drawings.

<System Configuration>

Figure 1:
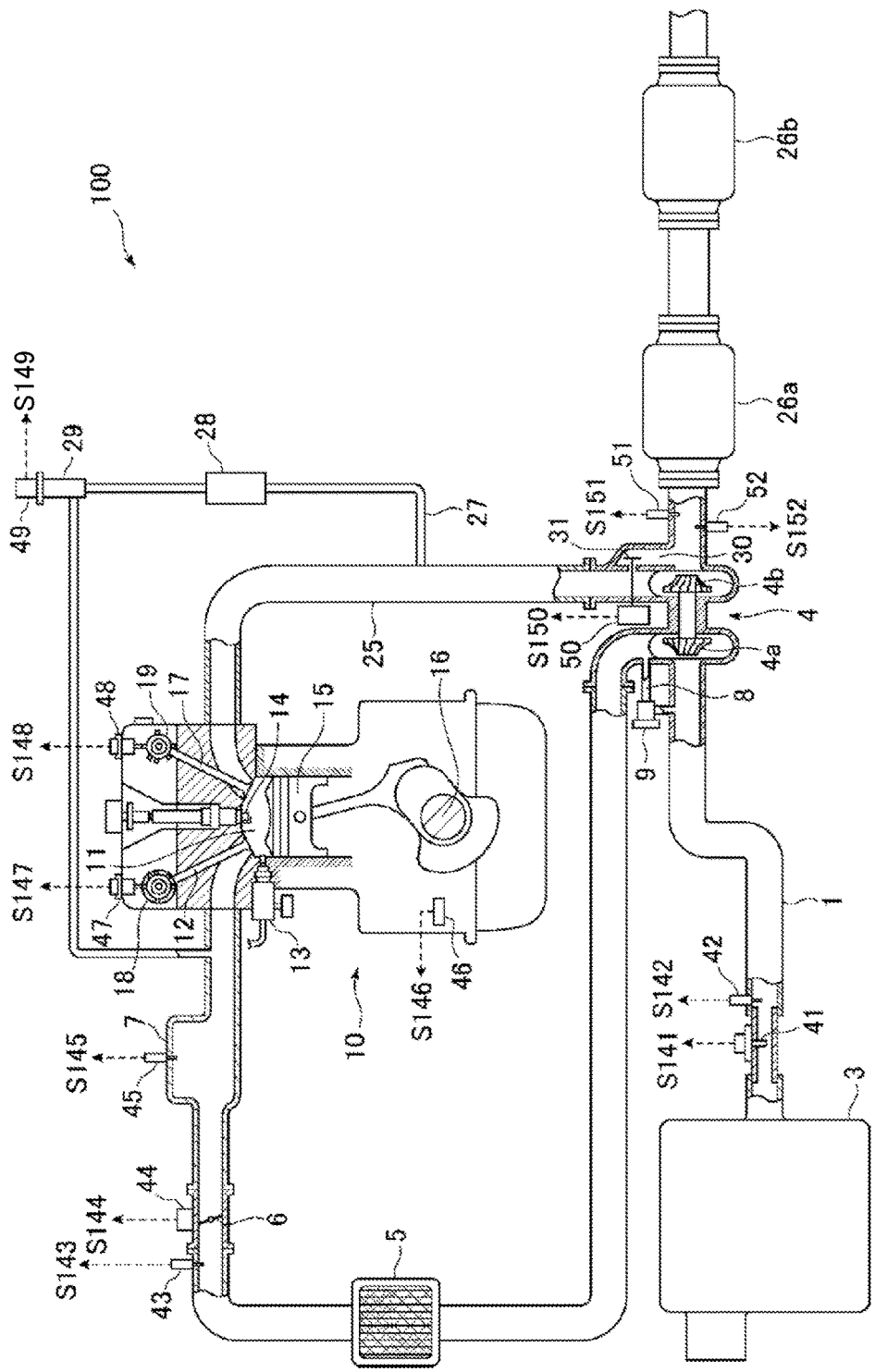
FIG. 1 is a schematic configuration view of an engine system to which a vehicle control device according to one embodiment of the present disclosure is applied.

First, an engine system to which the vehicle control device according to one embodiment is applied is described with reference to FIGS. 1 and 2. FIG. 1 is a schematic configuration view of the engine system, and FIG. 2 is a block diagram illustrating an electric configuration of the vehicle control device.

Figure 2:
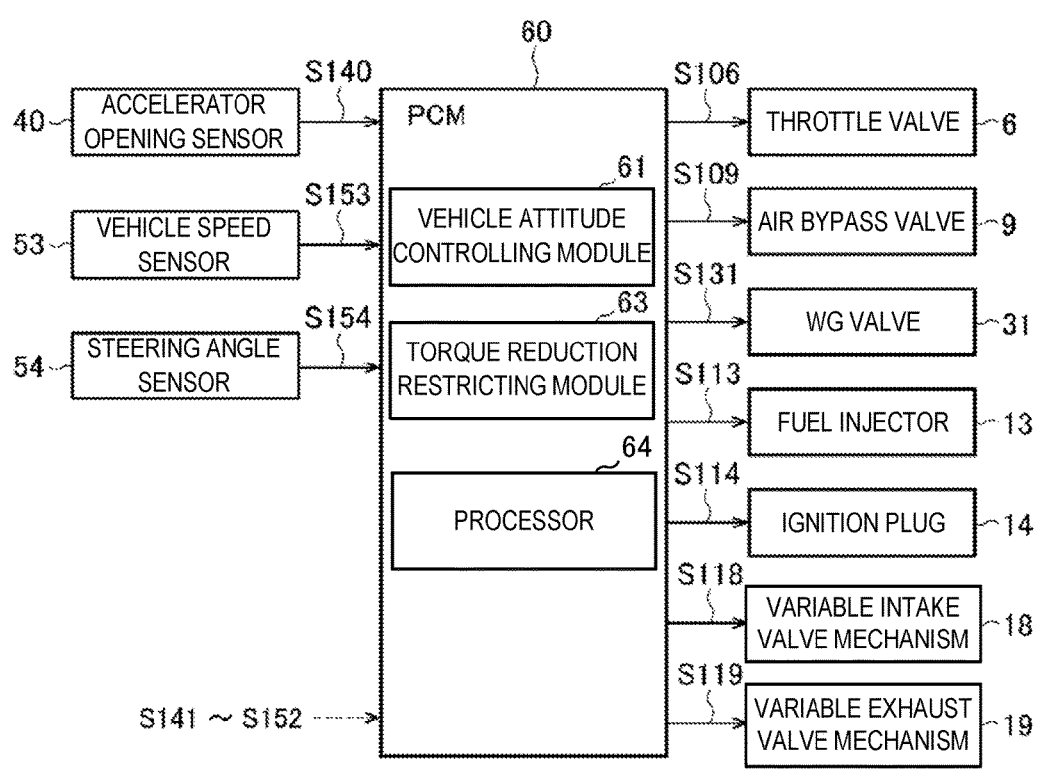
FIG. 2 is a block diagram illustrating an electric configuration of the vehicle control device according to the embodiment of the present disclosure.

As illustrated in FIGS. 1 and 2, the engine system 100 mainly has an intake passage 1 through which intake air (air) externally introduced passes, an engine 10 (particularly, a gasoline engine) for generating a driving force for a vehicle on which the engine 10 is mounted by combusting mixture gas of the intake air supplied from the intake passage 1 and fuel supplied from a fuel injector 13 (described later), an exhaust passage 25 through which exhaust gas generated by the combustion inside the engine 10 is discharged, sensors 40 to 54 for detecting various kinds of states regarding the engine system 100, and a PCM 60 for controlling the entire engine system 100.

In the intake passage 1, an air cleaner 3 for purifying the externally introduced intake air, a compressor 4a provided to a turbocharger 4 and for pressurizing the intake air passing therethrough, an intercooler 5 for cooling the intake air passing therethrough with outdoor air and a coolant, a throttle valve 6 for adjusting an amount of passing intake air (intake air amount), and a surge tank 7 for temporarily storing intake air to be supplied to the engine 10 are arranged in this order from upstream side.

Further provided in the intake passage 1 is an air bypass passage 8 for recirculating a portion of the intake air turbocharged by the compressor 4a back to upstream of the compressor 4a. One end of the air bypass passage 8 is connected to the intake passage 1 at a position downstream of the compressor 4a and upstream of the throttle valve 6, and the other end of the air bypass passage 8 is connected to the intake passage 1 at a position downstream of the air cleaner 3 and upstream of the compressor 4a.

The air bypass passage 8 is provided with an air bypass valve 9 for controlling a flow rate of the intake air passing through the air bypass passage 8 by an open-close operation. The air bypass valve 9 is a so-called on-off valve switchable between a closed state where the air bypass passage 8 is fully closed, and an open state where the air bypass passage 8 is fully opened.

The engine 10 mainly has an intake valve 12 for introducing the intake air supplied from the intake passage 1 into a combustion chamber 11, the fuel injector 13 for injecting the fuel into the combustion chamber 11, an ignition plug 14 for igniting the mixture gas of the intake air and the fuel supplied into the combustion chamber 11, a piston 15 for reciprocating by combustion of the mixture gas inside the combustion chamber 11, a crankshaft 16 for rotating by the reciprocation motion of the piston 15, and an exhaust valve 17 for discharging the exhaust gas generated by the combustion of the mixture gas inside the combustion chamber 11 to the exhaust passage 25.

Moreover, the engine 10 is capable of varying operation timings of the intake valve 12 and the exhaust valve 17 (corresponding to valve phases) by a variable intake valve mechanism 18 and a variable exhaust valve mechanism 19 as a variable valve timing mechanism, respectively. The variable intake valve mechanism 18 and the variable exhaust valve mechanism 19 may adopt various types of known mechanisms. For example, the operation timings of the intake and exhaust valves 12 and 17 may be varied using electromagnetic or hydraulic mechanisms.

In the exhaust passage 25, a turbine 4b provided to the turbocharger 4 and for rotating by passing exhaust gas so as to rotate the compressor 4a, and exhaust purification catalysts 26a and 26b having an exhaust gas purifying function (such as $NO_x$ catalyst, three-way catalyst, or oxidation catalyst) are arranged in this order from upstream side. Hereinafter, when referring to the exhaust purification catalysts 26a and 26b without distinguishing one from the other, they are simply referred to as "the exhaust purification catalyst 26."

The exhaust passage 25 is connected with an exhaust gas recirculation (EGR) passage 27 for recirculating a portion of the exhaust gas back to the intake passage 1. The EGR passage 27 is connected at one end to the exhaust passage 25 upstream of the turbine 4b and connected at the other end to the intake passage 1 downstream of the throttle valve 6. The EGR passage 27 is provided with an EGR cooler 28 for cooling the recirculated exhaust gas, and an EGR valve 29 for controlling a flow rate of the exhaust gas passing through the EGR passage 27.

Moreover, the exhaust passage 25 is provided with a turbine bypass passage 30 for guiding the exhaust gas to bypass the turbine 4b of the turbocharger 4. This turbine bypass passage 30 is provided with a wastegate valve (hereinafter, referred to as "the WG valve") 31 for controlling a flow rate of the exhaust gas passing through the turbine bypass passage 30.

The engine system 100 is provided with the sensors 40 to 54 for detecting the various kinds of states regarding the engine system 100. That is, the accelerator opening sensor 40 detects an accelerator opening which is an opening of an accelerator pedal (corresponding to a depression amount of the accelerator pedal by a vehicle driver). The airflow sensor 41 detects the intake air amount corresponding to a flow rate of the intake air which passes through the intake passage 1 between the air cleaner 3 and the compressor 4a. The first temperature sensor 42 detects a temperature of the intake air passing through the intake passage 1 between the air cleaner 3 and the compressor 4a. The first pressure sensor 43 detects a turbocharging pressure. The throttle opening sensor 44 detects a throttle opening which is an opening of the throttle valve 6. The second pressure sensor 45 detects a pressure inside an intake manifold (a pressure inside the surge tank 7) corresponding to the intake air pressure which is applied to the engine 10. The crank angle sensor 46 detects a crank angle of the crankshaft 16. The intake cam angle sensor 47 detects a cam angle of an intake camshaft. The exhaust cam angle sensor 48 detects a cam angle of an exhaust camshaft. The EGR opening sensor 49 detects an opening of the EGR valve 29. The WG opening sensor 50 detects an opening of the WG valve 31. The 02 sensor 51 detects an oxygen concentration within the exhaust gas. The exhaust gas temperature sensor 52 detects an exhaust gas temperature. The vehicle speed sensor 53 detects a speed of the vehicle (vehicle speed). The steering angle sensor 54 detects a rotational angle of a steering wheel. The exhaust gas temperature sensor 52 may be one example of the "temperature detector." The steering wheel may be one example of the "steering device." These various sensors 40 to 54 output detection signals S140 to S154 corresponding to the detected parameters to the PCM 60.

The PCM 60 controls various components of the engine system 100 based on the detection signals S140 to S154 received from the various sensors 40 to 54 described above. For example, as illustrated in FIG. 2, the PCM 60 supplies a control signal S106 to the throttle valve 6 to control the open and close timings and opening of the throttle valve 6, the PCM 60 supplies a control signal S109 to the air bypass valve 9 to cause the air bypass valve 9 to open/close, the PCM 60 supplies a control signal S131 to the WG valve 31 to control the opening of the WG valve 31, the PCM 60 supplies a control signal S113 to the fuel injector 13 to control a fuel injection amount and a fuel injection timing, the PCM 60 supplies a control signal S114 to the ignition plug 14 to control an ignition timing, and the PCM 60 supplies control signals S118 and S119 to the variable intake valve mechanism 18 and the variable exhaust valve mechanism 19 to control the operation timings of the intake valve 12 and the exhaust valve 17.

Further, the PCM 60 includes a vehicle attitude controlling module 61 for executing a vehicle attitude control in which an attitude of the vehicle is controlled by reducing a torque of the engine 10 to decelerate the vehicle when a condition that the vehicle is traveling and a steering angle related value which is related to a steering angle of the steering wheel (typically, a steering speed) increases is satisfied. For example, when this condition is satisfied, the vehicle attitude controlling module 61 reduces the engine torque by retarding the ignition timing of the ignition plug 14. The PCM 60 also includes a torque reduction restricting module 63 for restricting a reduction amount of the engine torque by the vehicle attitude controlling module 61 based on an engine load and/or an engine speed during the vehicle attitude control by the vehicle attitude controlling module 61.

The respective components of the PCM 60 are configured by a computer including a processor 64 (e.g. a CPU (central processing unit)) and internal memories, such as ROM(s) and RAM(s) for storing various programs which are interpreted and executed by the processor 64 (the programs include a basic control program (e.g., an OS) and an application program activated on the OS and for achieving a particular function), and various data. The processor 64 is configured to execute the vehicle attitude controlling module 61 and the torque reduction restricting module 63 to perform their respective functions. These modules are stored in the internal memory as one or more software programs.

<Control in First Embodiment>

Next, contents of a control performed by the PCM 60 in a first embodiment of the present disclosure are described with reference to FIGS. 3 to 6.

Figure 3:
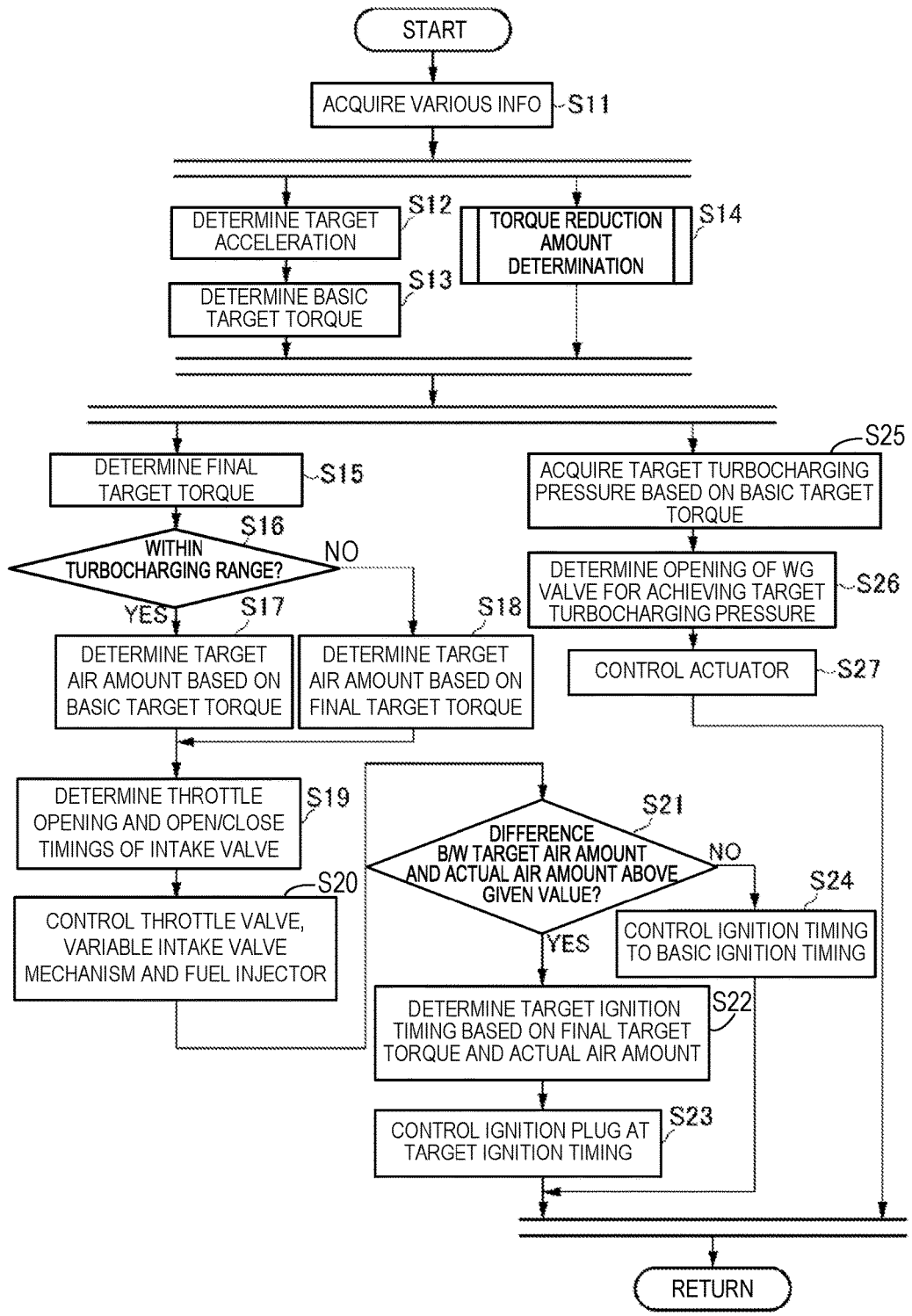
FIG. 3 is a flowchart illustrating an engine control according to a first embodiment of the present disclosure.
Figure 4:
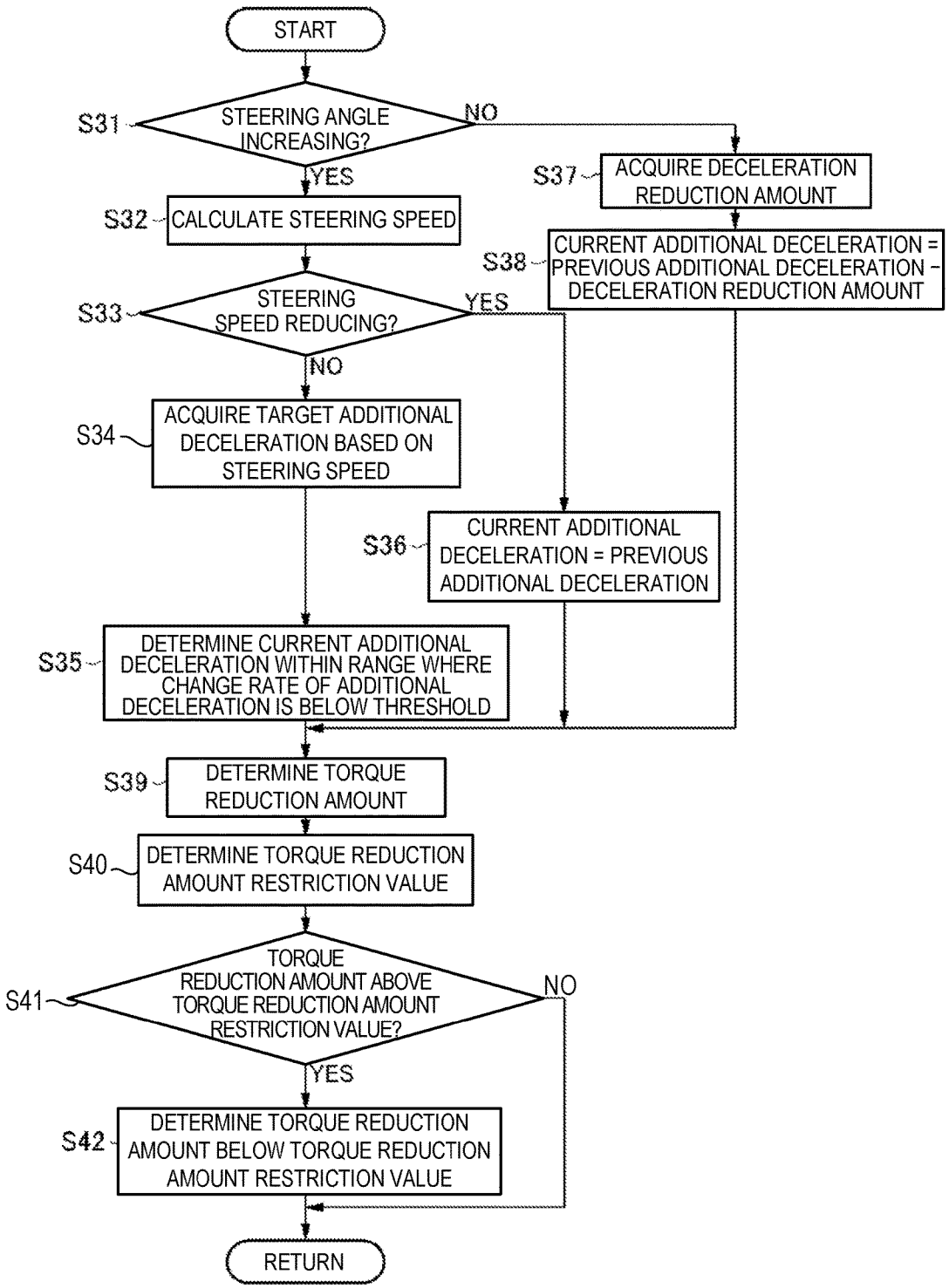
FIG. 4 is a flowchart illustrating a torque reduction amount determination according to the first embodiment of the present disclosure.
Figure 5:
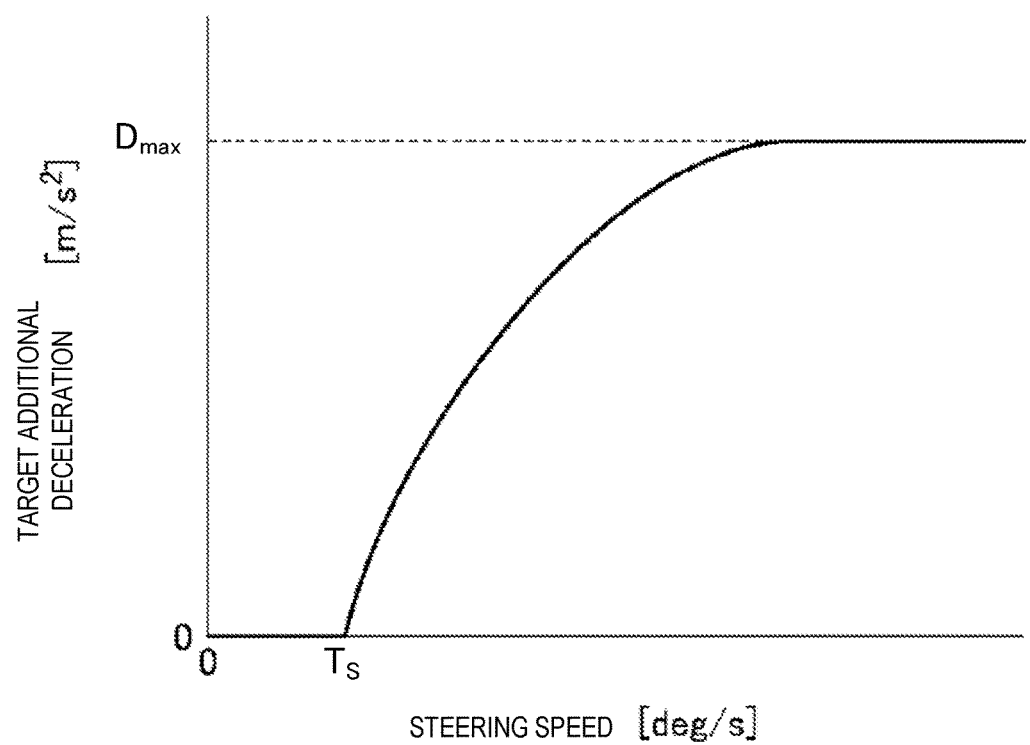
FIG. 5 is a map illustrating a target additional deceleration defined by a steering speed used in the first embodiment of the present disclosure.
Figure 6:
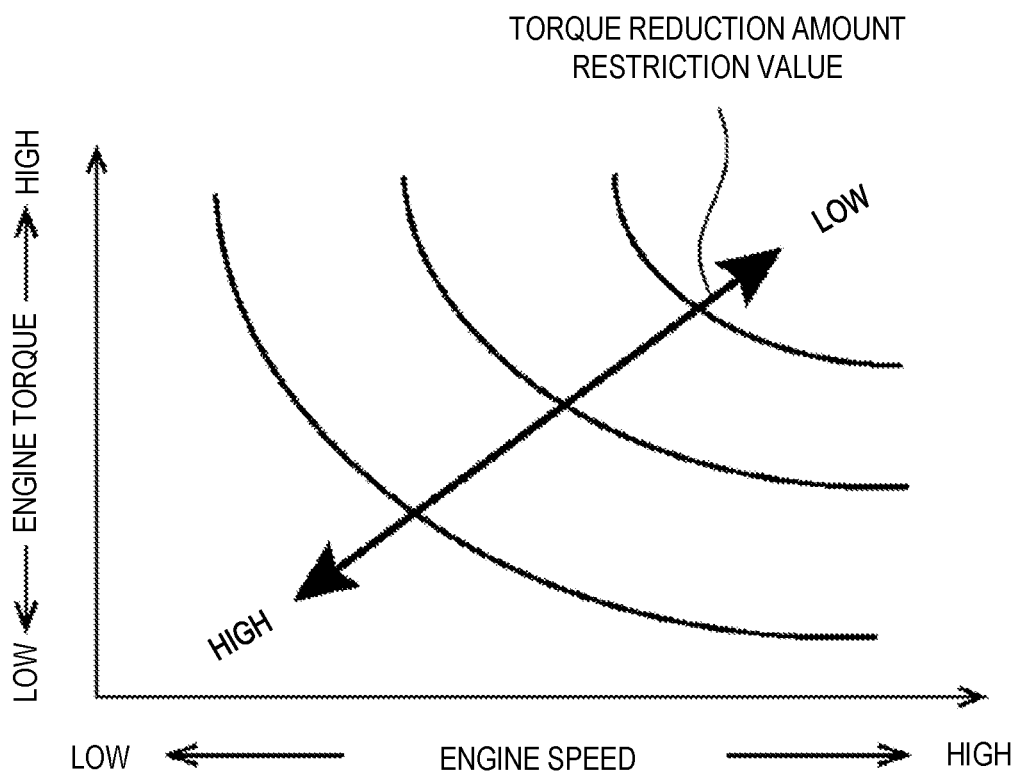
FIG. 6 is a map illustrating a torque reduction amount restriction value defined by an engine speed and an engine load used in the first embodiment of the present disclosure.

FIG. 3 is a flowchart illustrating an engine control according to the first embodiment of the present disclosure. FIG. 4 is a flowchart illustrating a torque reduction amount determination according to the first embodiment of the present disclosure. FIG. 5 is a map illustrating a target additional deceleration defined by the steering speed used in the first embodiment of the present disclosure. FIG. 6 is a map illustrating a torque reduction amount restriction value defined by the engine speed and load used in the first embodiment of the present disclosure.

The engine control of FIG. 3 is activated when an ignition switch of the vehicle is turned ON, and power is supplied to the PCM 60, etc. The engine control is repeatedly executed.

When the engine control is started, as illustrated in FIG. 3, the PCM 60 acquires an operating state of the vehicle at S11. For example, the PCM 60 acquires, as the operating state, the detection signals S140 to S154 outputted from the various sensors 40 to 54, including the accelerator opening detected by the accelerator opening sensor 40, the vehicle speed detected by the vehicle speed sensor 53, the steering angle detected by the steering angle sensor 54, and a gear position currently set at a transmission of the vehicle.

Next, at S12, the PCM 60 sets a target acceleration based on the operating state of the vehicle including the accelerator pedal operation acquired at S11. For example, the PCM 60 selects an acceleration characteristic map corresponding to the current vehicle speed and gear position from acceleration characteristic maps defined for various vehicle speeds and gear positions (they are created in advance and stored in memory, etc.). The PCM 60 determines the target acceleration corresponding to the current accelerator opening by referring to the selected acceleration characteristic map.

Next, at S13, the PCM 60 determines a basic target torque of the engine 10 for achieving the target acceleration determined at S12. In this case, the PCM 60 determines the basic target torque within a torque range which is outputtable by the engine 10, based on the vehicle speed, the gear position, a road surface slope, a road surface μ, etc. at this time point.

In parallel to the processing steps at S12 and S13, the PCM 60 performs the torque reduction amount determination at S14 for determining the torque reduction amount based on the operating state of the vehicle other than the accelerator pedal operation. This torque reduction amount determination process is described later in detail.

Next, at S15, the PCM 60 determines a final target torque by subtracting the torque reduction amount determined in the torque reduction amount determination at S14 from the basic target torque determined at S13.

Next, at S16, the PCM 60 determines whether the operating state of the engine 10 is within a turbocharging range where the compressor 4a performs turbocharging. For example, the PCM 60 uses a turbocharging map in which the operating state defined by the engine load and engine speed is categorized into the turbocharging range and a no-turbocharging range where the compressor 4a does not perform turbocharging are defined (the map is created in advance and stored in the memory, etc.). The PCM 60 determines which range the operating state corresponding to the basic target torque determined at S13 and the current engine speed falls in, between the turbocharging range and the no-turbocharging range.

If the operating state of the engine 10 is within the turbocharging range (S16: YES), the process proceeds to S17 where the PCM 60 determines a target air amount and a target equivalent ratio for causing the engine 10 to output the basic target torque determined at S13. That is, when the operating state of the engine 10 is determined to be within the turbocharging range, the PCM 60 prohibits the control of reducing the intake air amount which is in accordance with the reduction of the final target torque corresponding to the torque reduction amount change. Here, the PCM 60 controls the intake air amount according to the change of the final target torque which corresponds to the change of the basic target torque.

On the other hand, if the operation state of the engine 10 is determined to be in the no-turbocharging range (S16: NO), the process proceeds to S18 where the PCM 60 determines the target air amount and the target equivalent ratio for causing the engine 10 to output the final target torque determined at S15 which reflects the torque reduction amount.

By determining the target air amount as S17 or S18, in the case of achieving the torque reduction by reducing the intake air amount and retarding the ignition timing in the vehicle attitude control, a rate of the retarding amount of the ignition timing with respect to the reduction amount of the intake air amount is made larger within the turbocharging range than within the no-turbocharging range. In other words, the retarding amount of the ignition timing with respect to the reduction amount of the intake air amount is made relatively larger.

Next, at S19, in order to introduce the air of the target air amount determined at S17 or S18 to the engine 10, the PCM 60 determines the opening of the throttle valve 6, and the open and close timings of the intake valve 12 via the variable intake valve mechanism 18, in consideration of the air amount detected by the airflow sensor 31.

Next, at S20, the PCM 60 controls the throttle valve 6 and the variable intake valve mechanism 18 based on the throttle opening and the open and close timings of the intake valve 12 determined at S19, and also controls the fuel injector 13 based on the target equivalent ratio determined at S17 or S18 and an actual air amount which is estimated based on the detection signal S141 of the airflow sensor 41, etc.

Next, at S21, the PCM 60 determines whether a difference between the target air amount determined at S17 or S18 and the actual air amount estimated based on the detection signal S141 of the airflow sensor 41, etc. is above a given value.

If the difference between the target air amount and the actual air amount is above the given value (S21: YES), the process proceeds to S22 where the PCM 60 sets a target value of the ignition timing required for the engine 10 to output the final target torque (hereinafter, the target value is referred to as "target ignition timing"), based on the final target torque determined at S15 and the actual air amount actually introduced into the combustion chamber 11 by the control of the throttle valve 6 and the variable intake valve mechanism 18 at S20.

For example, the PCM 60 selects an ignition advance map corresponding to the estimated actual air amount and engine speed from ignition advance maps defining the relationship between the ignition timing and an indicated torque for various air amounts and various engine speeds (they are created in advance and stored in the memory, etc.). The PCM 60 determines, as the target ignition timing, the ignition timing corresponding to the current target indicated torque by referring to the selected ignition advance map.

In the ignition advance map, when the horizontal axis is the ignition timing and the vertical axis is the indicated torque, an upwardly bulging line in which the indicated torque takes a local maximum value when the ignition timing is MBT (Minimum Advance for Best Torque) and reduces as the ignition timing advances or retards.

For example, when the response of the actual air amount delays with respect to the reduction of the target air amount corresponding to the torque reduction request, and the actual air amount becomes excessive with respect to the target air amount, the indicated torque at MBT in the ignition advance map corresponding to the actual air amount is higher than that at MBT in the ignition advance map corresponding to the target air amount. In other words, the ignition timing corresponding to a target indicated torque of the ignition advance map corresponding to the actual air amount is retarded than the ignition timing corresponding to a target indicated torque of the ignition advance map corresponding to the target air amount. Thus, the target ignition timing shifts to the retarding side as the actual air amount becomes more excessive with respect to the target air amount.

Particularly, when the target air amount corresponding to the basic target torque is applied to prevent the reduction of the intake air amount within the turbocharging range (see S16 and S17), since the actual air amount becomes excessive with respect to the target air amount, the target ignition timing is determined on the retarding side.

Note that when the target ignition timing is on the retarding side of a given retarding limit, the retarding limit is determined as the target ignition timing. This retarding limit is a limit value of the retarding amount determined in advance by experiments in view of combustion stability taking a significant deterioration of combustion efficiency and a misfire into consideration.

Next, at S23, the PCM 60 controls the ignition plug 14 so that the ignition is performed at the target ignition timing determined at S22.

At S21, if the difference between the target air amount and the actual air amount is below the given value (S21: NO), the process proceeds to S24 where the PCM 60 controls the ignition plug 14 so that the ignition is performed at a basic ignition timing. The basic ignition timing is a timing required for causing the engine 10 to output the final target torque when the air of the target air amount is introduced into the combustion chamber 11. In this case, the basic ignition timing is set as close to MBT as possible within a range in which knocking does not occur, in the ignition advance map corresponding to the target air amount and the engine speed.

In parallel to the processing steps at S15 to S24, the PCM 60 acquires a target turbocharging pressure of the turbocharger 4 at S25. For example, a map showing a relationship between the target torque and the target turbocharging pressure is stored in the memory etc. in advance, and the PCM 60 acquires the target turbocharging pressure corresponding to the basic target torque determined at S13 by referring to the map.

Next, at S26, the PCM 60 determines the opening of the WG valve 31 for achieving the target turbocharging pressure acquired at S25.

Next, at S27, the PCM 60 controls an actuator of the WG valve 31 based on the opening set at S26.

In this case, in addition to controlling the actuator of the WG valve 31 according to the opening set at S26, the PCM 60 feedback-controls the actuator so that the turbocharging pressure detected by the first pressure sensor 43 approaches the target turbocharging pressure acquired at S25.

After S23, S24 and S27, the PCM 60 terminates the engine control.

Next, the torque reduction amount determination illustrated in FIG. 4 is described. The torque reduction amount determination is performed at S14 of FIG. 3.

When the torque reduction amount determination is started, at S31, the PCM 60 determines whether an absolute value of the steering angle acquired at S11 of FIG. 3 is increasing. If the absolute value of the steering angle is increasing (S31: YES), the process proceeds to S32 where the PCM 60 calculates the steering speed based on the steering angle acquired at S11.

Next, at S33, the PCM 60 determines whether the absolute value of the steering speed is reducing.

If the absolute value of the steering speed is not reducing (S33: NO), that is, if the absolute value of the steering speed is increasing or constant, the process proceeds to S34 where the PCM 60 acquires the target additional deceleration based on the steering speed. This target additional deceleration is a deceleration to be added to the vehicle according to the steering operation in order to accurately achieve the vehicle behavior intended by the driver.

For example, the PCM 60 acquires the target additional deceleration corresponding to the steering speed calculated at S32 based on the relationship between the target additional deceleration and the steering speed illustrated in the map of FIG. 5.

In FIG. 5, the horizontal axis indicates the steering speed and the vertical axis indicates the target additional deceleration. As illustrated in FIG. 5, when the steering speed is below a threshold $T_s$ (e.g., 10 deg/s), the corresponding target additional deceleration is 0. In other words, when the steering speed is below the threshold Ts, the deceleration addition to the vehicle is not performed according to the steering operation.

On the other hand, when the steering speed is above the threshold $T_s$, the target additional deceleration corresponding to this steering speed gradually approaches a given upper limit value $D_{max}$ (e.g., 1 m/s$^2$) as the steering speed increases. Thus, as the steering speed increases, the target additional deceleration increases while the increase rate thereof becomes lower.

Next, at S35, the PCM 60 determines the additional deceleration for the current processing within a range where an increase rate of the additional deceleration is below a threshold Rmax (e.g., 0.5 m/s).

For example, when the increase rate from the additional deceleration determined in the previous processing to the target additional deceleration determined at S34 in the current processing is below Rmax, the PCM 60 determines the target additional deceleration determined at S34 as the additional deceleration for the current processing.

On the other hand, if the change rate from the additional deceleration determined in the previous processing to the target additional deceleration determined at S34 in the current processing is larger than Rmax, the PCM 60 determines, as the additional deceleration for the current processing, a value obtained by increasing the additional deceleration from the value determined in the previous processing to the current processing at the increase rate Rmax.

At S33, if the absolute value of the steering speed is reducing (S33: YES), the process proceeds to S36 where the PCM 60 determines the additional deceleration determined in the previous processing as the additional deceleration for the current processing. That is, when the absolute value of the steering speed is reducing, the additional deceleration at a highest steering speed (i.e., a highest value of the additional deceleration) is maintained.

At S31, if the absolute value of the steering angle is not increasing (S31: NO), that is, if the absolute value of the steering angle is constant or reducing, the process proceeds to S37 where the PCM 60 acquires a reduction amount in the current processing, of the additional deceleration determined in the previous processing (deceleration reduction amount). This deceleration reduction amount is calculated, for example, based on a constant reduction rate (e.g., 0.3 m/s$^3$) stored in advance in the memory, etc. Alternatively, the deceleration reduction amount is calculated based on a reduction rate determined according to the operating state of the vehicle acquired at S11 and/or the steering speed calculated at S32.

At S38, the PCM 60 determines the additional deceleration for the current processing by subtracting the deceleration reduction amount acquired at S37 from the additional deceleration determined in the previous processing.

After S35, S36, or S38, at S39, the PCM 60 determines the torque reduction amount based on the current additional deceleration determined at S35, S36, or S38. For example, the PCM 60 determines the torque reduction amount required for achieving the current additional deceleration, based on the current vehicle speed, gear position, road surface slope, etc. acquired at S11.

Next, at S40, the PCM 60 determines the torque reduction amount restriction value for restricting the torque reduction amount described above based on the current engine load and speed. For example, the PCM 60 determines the torque reduction amount restriction value according to the current engine load and speed by referring to a map which is defined in advance, such as that illustrated in FIG. 6.

FIG. 6 schematically illustrates the map of the torque reduction amount restriction value which is to be set according to the engine speed and load, the horizontal axis indicating the engine speed and the vertical axis indicating the engine load. The torque reduction amount restriction value corresponds to a highest value (absolute value) of an allowable torque reduction amount.

According to the map illustrated in FIG. 6, the torque reduction amount restriction value is set to be an absolute value which becomes smaller as the engine speed and load increase. In this embodiment, as the engine speed and/or the engine load increases, the PCM 60 lowers the torque reduction amount restriction value to reduce the allowable torque reduction amount so that the torque reduction amount is restricted more.

As described in the Summary above, within the operating range where the engine speed and/or the engine load are high (typically, within the turbocharging range of the turbocharger 4), if the ignition timing is retarded for torque reduction so as to decelerate the vehicle in order to control the vehicle attitude (see S22 and S23 of FIG. 3), the exhaust gas temperature becomes high and reliability of the engine components tends to lower. In this embodiment, in order to prevent decreasing the reliability of the engine components (especially exhaust system components, typically the exhaust purification catalyst 26), the torque reduction amount restriction value is set according to the engine speed and load so that the torque reduction amount is suitably restricted. Therefore, the torque reduction amount restriction value is preferably set, according to the engine speed and the engine load, based on a highest torque reduction amount with which decreasing the reliability of the engine components due to the exhaust gas temperature increase which is caused by retarding the ignition timing is preventable.

Returning to FIG. 4, the PCM 60 proceeds to S41 after S40 and determines whether the torque reduction amount (absolute value) determined at S39 is above the torque reduction amount restriction value (absolute value) determined at S40. As a result, if the torque reduction amount is above the torque reduction amount restriction value (S41: YES), the process proceeds to S42 where the PCM 60 determines the torque reduction amount below the torque reduction amount restriction value so that the torque reduction amount is restricted. For example, the PCM 60 adopts the torque reduction amount restriction value itself as the torque reduction amount. On the other hand, if the torque reduction amount is below the torque reduction amount restriction value (S41: NO), the PCM 60 allows to keep the torque reduction amount unchanged and adopts it.

After completing the torque reduction amount determination, the PCM 60 returns to the main routine, that is, performs the processing steps after S15 of the engine control in FIG. 3.

Note that at S31, instead of determining whether the steering angle (absolute value) is increasing, whether the steering speed (that is, the change speed of the steering angle) is above a given value may be determined. For example, a start condition of the vehicle attitude control (torque reduction control) may be considered to be satisfied when the steering speed exceeds a first value, and the torque reduction amount may be determined at S33 to S36 and S39 sequentially. Then, when the steering speed falls below a second value, a termination condition of the vehicle attitude control may be considered to be satisfied and the torque reduction amount may be determined at S37 to S39 sequentially. In addition, these first and second values may adopt values according to the steering speed threshold $T_s$ illustrated in FIG. 5.

Next, the operations and effects of the vehicle control device according to the first embodiment of the present disclosure are described with reference to FIG. 7 which is a time chart illustrating a change of parameters related to the engine control over time in a case where the vehicle equipped with the vehicle control device of the first embodiment makes a turn by the steering wheel operation. Here, a situation where the vehicle makes a right turn is illustrated.

Figure 7:
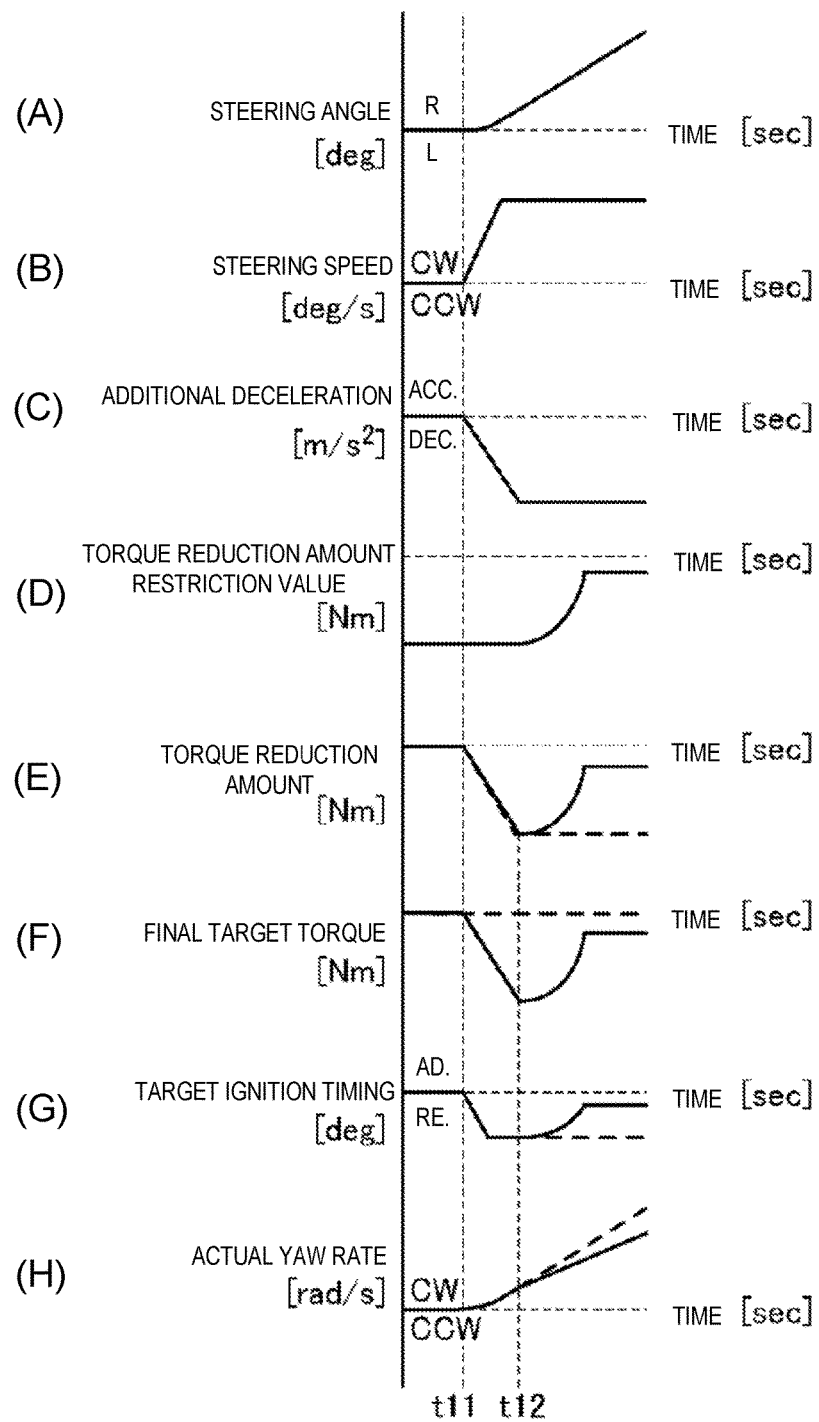
FIG. 7 is a time chart illustrating operations and effects of the vehicle control device according to the first embodiment of the present disclosure.

Part (A) of FIG. 7 is a line chart illustrating a change of the steering angle of the vehicle making the right turn, in which the horizontal axis indicates time and the vertical axis indicates the steering angle. As illustrated in Part (A) of FIG. 7, the rightward steering operation is started at time t11, and the rightward steering angle gradually increases as an additional steering-in operation is performed.

Part (B) of FIG. 7 is a line chart illustrating a change of the steering speed of the vehicle making the right turn as illustrated in Part (A) of FIG. 7, in which the horizontal axis indicates time and the vertical axis indicates the steering speed. The steering speed of the vehicle is expressed by a time differentiation of the steering angle of the vehicle. That is, as illustrated in Part (B) of FIG. 7, when the rightward steering is started at time t11, the rightward steering speed is generated.

Part (C) of FIG. 7 is a line chart illustrating a change of the additional deceleration determined based on the steering speed illustrated in Part (B), in which the horizontal axis indicates time and the vertical axis indicates the additional deceleration. As described with reference to FIG. 4, in the case where the absolute value of the steering angle is increasing and the absolute value of the steering speed is not reducing (S31: YES and S33: NO in FIG. 4), the PCM 60 acquires the target additional deceleration according to the steering speed (see FIG. 5) and, as illustrated in Part (C) of FIG. 7, increases the additional deceleration within a range where the increase rate of the additional deceleration is below the threshold Rmax (S35 of FIG. 4). Then, when the absolute value of the steering angle increases and the absolute value of the steering speed reduces (S31 and S33: YES in FIG. 4), the PCM 60 keeps the additional deceleration for when the steering speed is at the highest value.

Part (D) of FIG. 7 is a line chart illustrating a change of the torque reduction amount restriction value determined based on the engine speed and load, in which the horizontal axis indicates time and the vertical axis indicates the torque reduction amount restriction value. The PCM 60 determines the torque reduction amount restriction value corresponding to the current engine speed and load by referring to the map illustrated in FIG. 6 (S40 of FIG. 4). In this case, until time t12, since the engine speed and/or the engine load are relatively low and constant, the PCM 60 determines the torque reduction amount restriction value continuously at a relatively high absolute value. Then, from time t12, since the engine speed and/or the engine load increase, the PCM 60 determines the torque reduction amount restriction value at a relatively low absolute value. For example, due to the engine speed and/or the engine load gradually increasing (not illustrated), the PCM 60 gradually reduces the torque reduction amount restriction value according to the change of the engine speed and/or the engine load.

Part (E) of FIG. 7 is a line chart illustrating a change of the torque reduction amount determined based on the additional deceleration illustrated in Part (C) of FIG. 7, in which the horizontal axis indicates time and the vertical axis indicates the torque reduction amount. Further, in Part (E), the solid line indicates the torque reduction amount applied in the first embodiment, and the dashed line indicates a torque reduction amount applied in a comparative example. Particularly, in the first embodiment, the torque reduction amount is determined based on the additional deceleration by taking into consideration the torque reduction amount restriction value. On the other hand, in the comparative example, the torque reduction amount is determined based on the additional deceleration without taking into consideration the torque reduction amount restriction value.

As described above, the PCM 60 determines the torque reduction amount required for achieving the additional deceleration based on the parameters, such as the current vehicle speed, the gear position, the road surface slope, etc. (S39 of FIG. 4). When these parameters are constant, the PCM 60 determines a torque reduction amount which changes similarly to the change of the additional deceleration illustrated in Part (C) of FIG. 7. In the comparative example, this torque reduction amount is applied (see the dashed line graph of Part (E)).

In the first embodiment, the PCM 60 restricts the torque reduction amount determined as described above, by the torque reduction amount restriction value illustrated in Part (D) of FIG. 7. In this case, since the torque reduction amount (absolute value) exceeds the torque reduction amount restriction value (absolute value) after time t12 (S41: YES in FIG. 4), the PCM 60 determines the torque reduction amount below the torque reduction amount restriction value, specifically, applies the torque reduction amount restriction value as the torque reduction amount (S42 of FIG. 4). As a result, according to the first embodiment, the torque reduction amount (absolute value) is restricted to a relatively low value after time t12 (see the solid line graph of Part (E) of FIG. 7).

Part (F) of FIG. 7 is a line chart illustrating a change of the final target torque determined based on the basic target torque and the torque reduction amount, in which the horizontal axis indicates time and the vertical axis indicates torque. Further, in Part (F), the dashed line indicates the basic target torque and the solid line indicates the final target torque. As described with reference to FIG. 3, the PCM 60 determines the final target torque by subtracting the torque reduction amount determined by the torque reduction amount determination at S14 from the basic target torque determined at S13. Thus, as indicated by the solid line in Part (F) of FIG. 7, the change of the torque reduction amount (see the solid line graph of Part (E) of FIG. 7) is reflected on the final target torque. In this case, the final target torque gently follows the torque corresponding to the torque reduction amount restriction value.

Part (G) of FIG. 7 is a line chart illustrating the target ignition timing determined based on the final target torque and the actual air amount, with reference to an ignition timing required for causing the engine 10 to output the final target torque when the air of the target air amount is introduced into the combustion chamber 11 (hereinafter, referred to as "basic ignition timing"). In Part (G), the horizontal axis indicates time and the vertical axis indicates the ignition timing with reference to the basic ignition timing. Further, the solid line indicates the ignition timing applied in the first embodiment and the dashed line indicates the ignition timing applied in the comparative example.

Basically, when the target air amount lowers according to the reduction of the final target torque, the actual air amount becomes excessive with respect to the target air amount, and the final target torque reduction cannot be achieved only by the reduction of the actual air amount. Therefore, as described above, the final target torque reduction is achieved by retarding the target ignition timing from the basic ignition timing. In the comparative example, this target ignition timing is applied (see the dashed line graph of Part (G) of FIG. 7).

In the first embodiment, in order to prevent decreasing the reliability of the engine components due to the exhaust gas temperature becoming high because of the retarding of the ignition timing, the PCM 60 restricts the torque reduction amount by the torque reduction amount restriction value as illustrated in Part (E) of FIG. 7 (the reduction of the final target torque is prevented as a result). Thus, according to the first embodiment, after time t12, the retarding amount of the target ignition timing is restricted more than the comparative example, that is, the target ignition timing is advanced than the comparative example (see the solid line graph of Part (G) of FIG. 7).

Part (H) of FIG. 7 illustrates a yaw rate (actual yaw rate) which occurs in the vehicle when the engine 10 is controlled to achieve the final target torque in the case where the vehicle is steered as illustrated in Part (A) of FIG. 7. In Part (H), the horizontal axis indicates time and the vertical axis indicates the yaw rate. Further, the solid line indicates the change according to the first embodiment and the dashed line indicates the change according to the comparative example.

When the rightward steering is started at time t11 and the torque reduction amount is increased as illustrated in Part (E) of FIG. 7 as the rightward steering speed increases, a load to front wheels which are steerable wheels of the vehicle increases. As a result, a frictional force between the front wheels and the road surface increases and a cornering force of the front wheels increases, and turnability of the vehicle improves. Thus, as illustrated in Part (H) of FIG. 7, a relatively large yaw rate in the clockwise direction (CW) is generated in the vehicle. In this case, according to the first embodiment, since the torque reduction amount is restricted by the torque reduction amount restriction value as illustrated in Part (E) of FIG. 7 after time t12, compared with the comparative example (see the dashed line graph of Part (H) of FIG. 7), the yaw rate generated in the vehicle decreases (see the solid line graph of Part (H) of FIG. 7).

As illustrated in FIG. 7, according to the first embodiment, when executing the vehicle attitude control in which the vehicle is decelerated by retarding the ignition timing and reducing the engine torque, the torque reduction amount of the engine 10 is restricted (that is, the torque reduction amount is restricted more) as the engine speed and/or the engine load become larger. Thus, when the vehicle attitude control is executed within a high engine speed range and/or a high engine load range (typically, within the turbocharging range), by suitably restricting the torque reduction amount, the retarding amount of the ignition timing is restricted and the exhaust gas temperature is prevented from becoming high. Also in a case where the vehicle attitude control is frequently executed while the vehicle is traveling on a road, such as a winding road, the exhaust gas temperature is prevented from becoming high. As a result, it becomes possible to reliably prevent decreasing the reliability of the component provided in or near the exhaust passage 25. Here, "the component" includes sensors, such as the $O_2$ sensor 51 and the exhaust gas temperature sensor 52 disposed in the exhaust passage 25, the exhaust purification catalyst 26, and various kinds of actuators provided close to the exhaust passage 25.

Note that the restriction of the torque reduction amount as in the first embodiment may not be performed only within the high engine speed range and/or the high engine load range, but performed basically within the entire operating range of the engine 10. For example, the restriction of the torque reduction amount of the first embodiment may not be performed only within the turbocharging range, but performed in both the turbocharging range and the no-turbocharging range.

<Control in Second Embodiment>

Next, a control executed by the PCM 60 in a second embodiment of the present disclosure is described. Hereinafter, only the different control from the first embodiment is described and description of the same control as in the first embodiment is omitted (same for the operations and effects). In other words, the contents not described here are the same as in the first embodiment.

In the first embodiment described above, the PCM 60 restricts the torque reduction amount during vehicle attitude control as the engine speed and/or the engine load increase. In the second embodiment, when the engine 10 is operated within an operating range above a given load, the torque reduction amount during the vehicle attitude control is restricted more than when the engine 10 is operated within an operating range below the given load. Particularly, in the second embodiment, the PCM 60 sets the operating range above the given load within the turbocharging range (hereinafter, the operating range above the given load is referred to as "torque reduction restricted range"), and restricts the torque reduction amount during the vehicle attitude control when the engine 10 is operated within the torque reduction restricted range.

Figure 8:
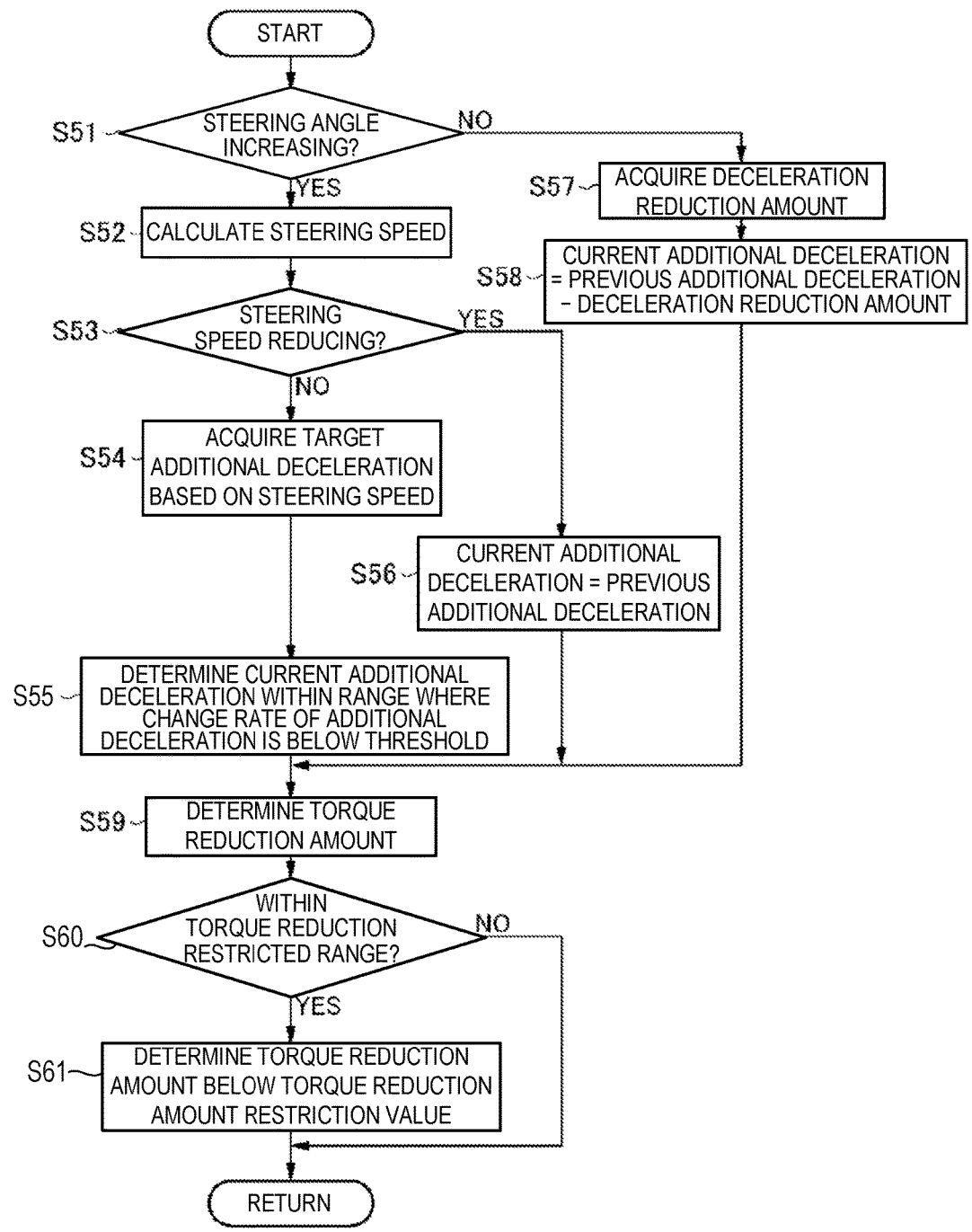
FIG. 8 is a flowchart illustrating a torque reduction amount determination according to a second embodiment of the present disclosure.
Figure 9:
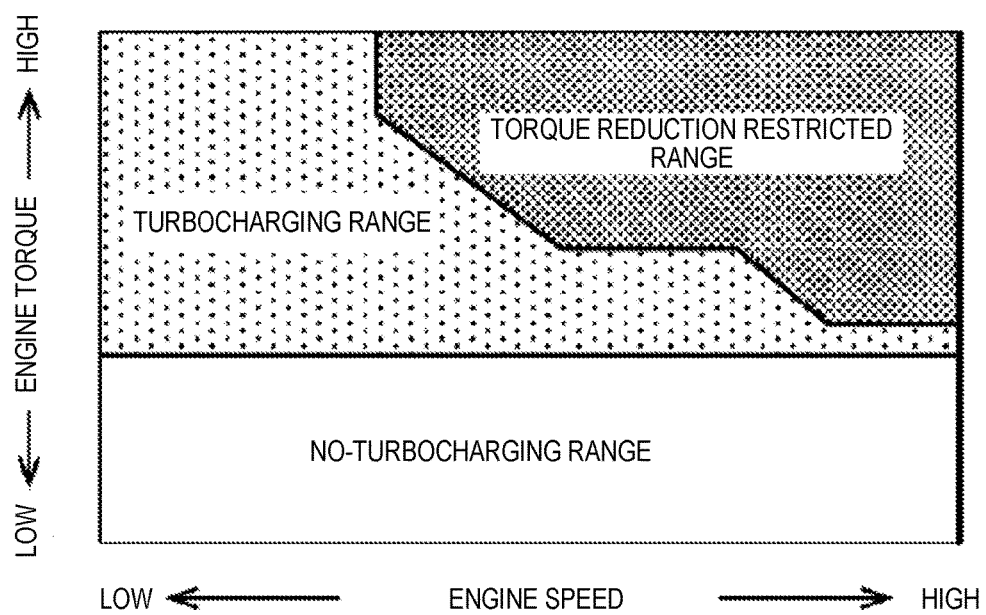
FIG. 9 is a chart illustrating a torque reduction restricted range according to the second embodiment of the present disclosure.

With reference to FIGS. 8 and 9, the control of the second embodiment is described in detail. FIG. 8 is a flowchart illustrating the torque reduction amount determination according to the second embodiment of the present disclosure. FIG. 9 is a chart illustrating the torque reduction restricted range according to the second embodiment of the present disclosure. Note that the torque reduction amount determination of FIG. 8 is executed at S14 of FIG. 3 instead of the torque reduction amount determination in FIG. 4.

Since the processing steps at S51 to S59 of FIG. 8 are the same as the processing steps at S31 to S39 of FIG. 4, respectively, the description thereof is omitted. Here, only the process from S60 is mainly described.

At S60, the PCM 60 determines whether the operating state of the engine 10 is within the torque reduction restricted range (see FIG. 9). As illustrated in FIG. 9, a turbocharging map is defined by dividing the operating state which is defined by the engine speed (horizontal axis) and the engine torque (vertical axis) into the turbocharging range and the no-turbocharging range, and the torque reduction restricted range is defined on the turbocharging map. For example, the torque reduction restricted range corresponds to a high speed and load section of the turbocharging range.

Returning to FIG. 8, when the operating state of the engine 10 is within the torque reduction restricted range (S60: YES), the process proceeds to S61 where the PCM 60 determines the torque reduction amount below the torque reduction amount restriction value so that the torque reduction amount determined at S59 is restricted. For example, the PCM 60 adopts the torque reduction amount restriction value itself as the torque reduction amount. In this case, the PCM 60 uses a given fixed value as the torque reduction amount restriction value, for example. The torque reduction amount restriction value may be set based on a highest torque reduction amount with which decreasing the reliability of the engine components due to the exhaust gas temperature increase that is caused by retarding the ignition timing is preventable. In another example, the PCM 60 uses the torque reduction amount restriction value which changes according to the engine speed and/or the engine load as in the first embodiment. On the other hand, when the operating state of the engine 10 is not within the torque reduction restricted range (S60: NO), the PCM 60 allows to keep the torque reduction amount determined at S59 unchanged and adopts it.

Note that the torque reduction restricted range may be extended based on the exhaust gas temperature detected by the exhaust gas temperature sensor 52. For example, as the exhaust gas temperature becomes higher, the torque reduction restricted range where the torque reduction amount is restricted may be extended since it becomes easier for the reliability of the engine components to decrease. In this case, as the exhaust gas temperature becomes higher, both the engine load and speed that define the boundary (lower boundary) of the torque reduction restricted range may be set lower. Naturally, as the exhaust gas temperature becomes lower, the torque reduction restricted range may be narrowed since it becomes more difficult for the reliability of the engine components to decrease.

Next, the operations and effects of the vehicle control device of the second embodiment are described with reference to FIG. 10 which is a time chart illustrating a change of parameters related to the engine control over time in a case where the vehicle equipped with the vehicle control device of the second embodiment turns by the steering wheel operation. Here, a situation where the vehicle makes a right turn is illustrated.

Figure 10:
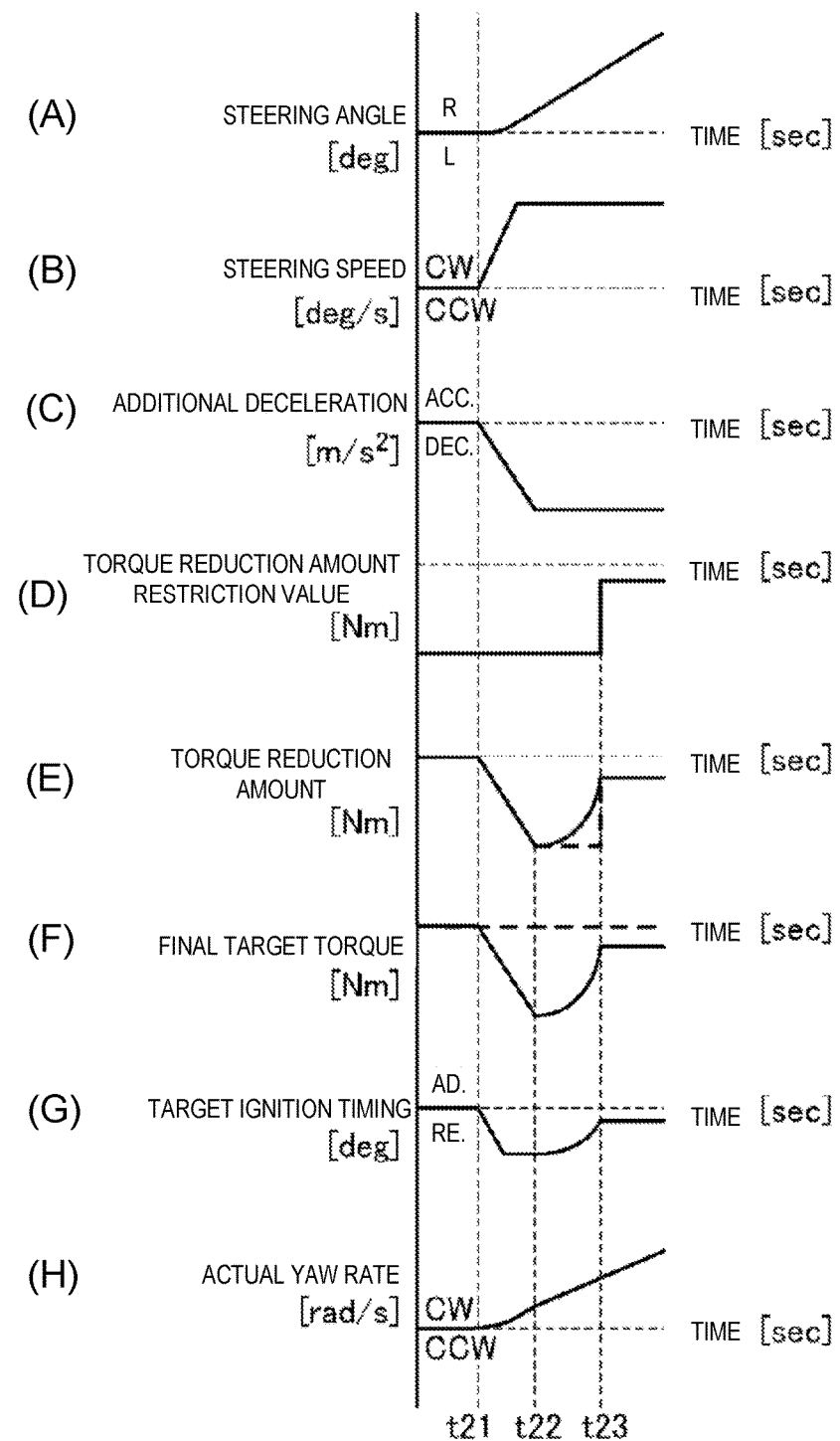
FIG. 10 is a time chart illustrating operations and effects of the vehicle control device according to the second embodiment of the present disclosure.

Since Parts (A) to (C) of FIG. 10 are the same as Parts (A) to (C) of FIG. 7, the description thereof is omitted.

Part (D) of FIG. 10 is a line chart illustrating a change of the torque reduction amount restriction value, in which the horizontal axis indicates time and the vertical axis indicates the torque reduction amount restriction value. Since the operating state of the engine 10 falls within the torque reduction restricted range at time t23, the PCM 60 reduces the torque reduction amount restriction value stepwise so that the torque reduction amount is restricted. In this case, the PCM 60 applies the torque reduction amount restriction value which is the fixed value as described above.

Part (E) of FIG. 10 is a line chart illustrating a change of the torque reduction amount determined based on the additional deceleration illustrated in Part (C) of FIG. 10, in which the horizontal axis indicates time and the vertical axis indicates the torque reduction amount. Further in Part (E), the solid line indicates the torque reduction amount applied in the second embodiment, and the dashed line indicates the torque reduction amount applied in a comparative example.

Basically, the torque reduction amount required for achieving the additional deceleration based on the parameters, such as the current vehicle speed, the gear position, the road surface slope, etc. In the comparative example, when such a torque reduction amount (absolute value) exceeds the torque reduction amount restriction value (absolute value) illustrated in Part (D) of FIG. 10, the torque reduction amount is restricted by the torque reduction amount restriction value. As a result, in the comparative example, at time t23, the torque reduction amount restriction value is applied to the torque reduction amount, and the torque reduction amount (absolute value) reduces stepwise (see the dashed line graph of Part (E) of FIG. 10).

On the other hand, in the second embodiment, the PCM 60 predicts the change (stepwise change) of the torque reduction amount restriction value as illustrated in Part (D) of FIG. 10 based on the operating state of the engine 10, and the torque reduction amount is restricted before the torque reduction amount restriction value changes, that is, before the torque reduction amount (absolute value) actually exceeds the torque reduction amount restriction value (absolute value). For example, the PCM 60 controls the torque reduction amount to gradually follow the future torque reduction amount restriction value. As a result, the torque reduction amount (absolute value) gently reduces from time t22 (see the solid line graph of Part (E) of FIG. 10). Since the torque reduction amount gently changes in the second embodiment compared with the comparative example, a sharp change of the engine torque is prevented.

Parts (F), (G) and (H) of FIG. 10 illustrate changes of the final target torque, the target ignition timing, and the actual yaw rate when the torque reduction amount according to the second embodiment is applied, respectively. Since the changes illustrated in these Parts (F), (G) and (H) are similar to those in the first embodiment illustrated in Parts (F), (G) and (H) of FIG. 7, the description thereof is omitted.

According to the second embodiment described above, when executing the vehicle attitude control, by using the torque reduction restricted range defined within the turbocharging range, the torque reduction amount of the engine 10 is restricted (that is, the torque reduction amount is restricted more) when the operating state of the engine 10 within the torque reduction restricted range than when it is outside the torque reduction restricted range. Also by this, the torque reduction amount is suitably restricted during the vehicle attitude control to restrict the retarding amount of the ignition timing and prevent the exhaust gas temperature from becoming high. Therefore, it becomes possible to reliably prevent decreasing the reliability of the component provided in or near the exhaust passage 25.

<Modifications>

In the above embodiment, the torque reduction amount of the engine 10 is basically restricted based on both the engine load and speed; however, in another example, the torque reduction amount may be restricted based only on one of the engine load and speed. In the case of using only the engine load, the torque reduction amount may be restricted more when the engine load is above a given load than when the engine load is below the given load. In the case of using only the engine speed, the torque reduction amount may be restricted more when the engine speed is above a given speed than when the engine speed is below the given speed.

In the above embodiment, the vehicle attitude control is executed based on the steering angle and the steering speed. However, in another example, instead of the steering angle and the steering speed, the vehicle attitude control may be executed based on the yaw rate or a lateral acceleration. These steering angle, steering speed, yaw rate and lateral acceleration are examples of "steering angle related value."

In the above embodiment, although the present disclosure is applied to the engine 10 having the turbocharger 4 (turbocharged engine), the application of the present disclosure is also applicable to an engine without a turbocharger. This is because even in engines that do not have a turbocharger, an ignition timing retarding control for achieving a desired engine torque in the vehicle attitude control is executed with excellent responsiveness by applying the present disclosure.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Intake Passage
4 Turbocharger
4a Compressor
4b Turbine
6 Throttle Valve
9 Air Bypass Valve
10 Engine
13 Fuel Injector
14 Ignition Plug
18 Variable Intake Valve Mechanism
25 Exhaust Passage
26a, 26b Exhaust Purification Catalyst
31 WG Valve
52 Exhaust Gas Temperature Sensor
53 Vehicle Speed Sensor
54 Steering Angle Sensor
60 PCM
61 Vehicle Attitude Controlling Module
63 Torque Reduction Restricting Module
100 Engine System

What is claimed is:

1. A vehicle control device, comprising:
an engine including an ignition plug oriented inside a combustion chamber;
a component provided in or near an exhaust passage of the engine; and
a processor configured to execute:
a vehicle attitude controlling module for controlling an attitude of a vehicle by retarding an ignition timing of the ignition plug to reduce an engine torque so as to decelerate the vehicle, when a condition is satisfied, the condition being that the vehicle is traveling and a steering angle related value that is related to a steering angle of a steering device increases; and
a torque reduction restricting module for restricting a reduction amount of the engine torque as at least one of an engine load and an engine speed increases during the vehicle attitude control.

2. The vehicle control device of claim 1, wherein the torque reduction restricting module restricts the reduction amount of the engine torque as the engine load and the engine speed increase.

3. The vehicle control device of claim 2, wherein
the engine includes a turbocharger having a compressor that is provided in an intake passage of the engine and for turbocharging by the compressor intake air to be supplied into the combustion chamber within a turbocharging range where the engine load is above a given value, and
the torque reduction restricting module restricts the engine torque reduction amount regardless of being within the turbocharging range.

4. The vehicle control device of claim 3, wherein the torque reduction restricting module:
sets a torque reduction amount restriction value for restricting the reduction amount of the engine torque; and when the reduction amount of the engine torque is above the torque reduction amount restriction value, controls the engine torque to gently follow the torque corresponding to the torque reduction amount restriction value.

5. The vehicle control device of claim 4, wherein the torque reduction restricting module restricts the reduction amount of the engine torque by restricting the retarding of the ignition timing.

6. The vehicle control device of claim 5, further comprising a steering angle sensor for detecting the steering angle of the steering device,
wherein the vehicle attitude controlling module uses a condition in that a change speed of the detected steering angle is above a given value as the condition in that the steering angle related value increases.

7. The vehicle control device of claim 6, wherein the component includes an exhaust purification catalyst provided in the exhaust passage and for purifying exhaust gas of the engine.

8. The vehicle control device of claim 1, wherein the torque reduction restricting module restricts, during the vehicle attitude control, a reduction amount of the engine torque more when an engine load is a first load and an engine speed is a first speed than at least one of when the engine load is a second load and when the engine speed is a second speed, the second load being below the first load, the second speed being below the first speed.

9. A vehicle control device, comprising:
an engine including an ignition plug oriented inside a combustion chamber;
a component provided in or near an exhaust passage of the engine;
a processor configured to execute a vehicle attitude controlling module for controlling an attitude of a vehicle by retarding an ignition timing of the ignition plug to reduce an engine torque so as to decelerate the vehicle, when a condition is satisfied, the condition being that the vehicle is traveling and a steering angle related value that is related to a steering angle of a steering device increases; and
a torque reduction restricting module for restricting, during the vehicle attitude control, a reduction amount of the engine torque more when an engine load is a first load than when the engine load is a second load that is below the first load.

10. The vehicle control device of claim 9, wherein the torque reduction restricting module restricts, during the vehicle attitude control, a reduction amount of the engine torque more within a first operating range of the engine where an engine load is above a given load than outside the first operating range.

11. The vehicle control device of claim 10, wherein the engine includes a turbocharger having a compressor that is provided in an intake passage of the engine and for turbocharging by the compressor intake air to be supplied into the combustion chamber within a turbocharging range where the engine load is above a given value, and
the first operating range is set within the turbocharging range.

12. The vehicle control device of claim 11, wherein the vehicle attitude controlling module reduces the engine torque by reducing an amount of intake air supplied into a cylinder of the engine in addition to retarding the ignition timing, the ignition timing being retarded at a higher rate with respect to a reduction amount of the intake air amount within the turbocharging range than outside the turbocharging range.

13. The vehicle control device of claim 12, further comprising a temperature detector provided in the exhaust passage,
wherein the given load is set lower as the temperature detected by the temperature detector is higher.

14. The vehicle control device of claim 13, wherein the torque reduction restricting module restricts the reduction amount of the engine torque when an operating range of the engine is within the first operating range and a second operating range where an engine speed is above a given speed.

15. The vehicle control device of claim 14, further comprising a temperature detector provided in the exhaust passage,
wherein the given speed is set lower as the temperature detected by the temperature detector is higher.

16. A vehicle control device, comprising:
an engine including an ignition plug oriented inside a combustion chamber;
a component provided in or near an exhaust passage of the engine; and
a processor configured to execute:
a vehicle attitude controlling module for controlling attitude of a vehicle by retarding an ignition timing of the ignition plug to reduce an engine torque so as to decelerate the vehicle, when a condition is satisfied, the condition being that the vehicle is traveling and a steering angle related value that is related to a steering angle of a steering device increases; and
a torque reduction restricting module for restricting, during the vehicle attitude control, a reduction amount of the engine torque more when an engine speed is a first speed than when the engine speed is a second speed that is below the first speed.

* * * * *